Sept. 24, 1968   J. LA RUSSA ET AL   3,402,977
WIDE ANGLE BINOCULAR TELESCOPIC INSTRUMENT HAVING THE
AXES OF THE TELESCOPES CONVERGING
TOWARDS THE OBSERVER
Filed April 18, 1962                    2 Sheets-Sheet 1

INVENTORS
JOSEPH LaRUSSA
MARTIN SHENKER
BY
ATTORNEYS

Sept. 24, 1968 J. LA RUSSA ET AL 3,402,977
WIDE ANGLE BINOCULAR TELESCOPIC INSTRUMENT HAVING THE
AXES OF THE TELESCOPES CONVERGING
TOWARDS THE OBSERVER
Filed April 18, 1962 2 Sheets-Sheet 2

INVENTORS
JOSEPH La RUSSA
MARTIN SHENKER
BY
ATTORNEYS

United States Patent Office 3,402,977
Patented Sept. 24, 1968

3,402,977
WIDE ANGLE BINOCULAR TELESCOPIC INSTRUMENT HAVING THE AXES OF THE TELESCOPES CONVERGING TOWARDS THE OBSERVER
Joseph La Russa, Yonkers, and Martin Shenker, Monsey, N.Y., assignors to Farrand Optical Co., Inc., New York, N.Y., a corporation of New York
Filed Apr. 18, 1962, Ser. No. 188,347
6 Claims. (Cl. 350—36)

This invention relates to binocular telescopes and more particularly to binocular telescopes in which the separate telescopes are uncollimated. The invention provides a binocular telescopic visual image-forming instrument in which the two telescopes are of low power, are preferably of erecting type, have a wide angular field, and are disposed with their axes convergent towards the observer. The inclination of the axes of the two telescopes is such that their fields may include a substantial amount of overlap.

More specifically, the invention provides a binocular instrument including two telescopes of low power having each a true angular field of the order of 70° to 90° and an exit pupil positioned well clear of the last air-glass surface of the system. The binocular telescopic visual instrument of the invention including two such telescopes permits the user to view a true horizontal angular field of the order of 150°, the large eye relief permitting the simultaneous placement of the observer's two eyes at the exit pupils of the two telescopes. The two telescopes are of the same or nearly the same power, and are preferably of erecting type and are disposed with their axes convergent towards the observer so as to give him a field of view of the order of twice that of the individual telescopes. In a preferred embodiment moreover the two telescopes are of unit or nearly unit power and are erecting in nature, thus conferring upon the instrument the advantages of constant deviation. The two telescopes may be oriented so that their individual fields partially overlap, thus providing the user with binocular vision over a central portion of his field of view and with monocular vision over a much wider angular field.

In embodiments employing erecting telescopes of unit power, each telescope constitutes a constant deviation device so that telescope motion produces no image motion. In addition, each telescope effectively presents a stationary field stop against the object space. Due to the inclination of the two telescope axes in the instrument of the invention, the separate field stops which the individual telescopes provide are in effect pulled apart to increase the user's field of view. In this way a very wide overall horizontal field of view is obtained with the central portion thereof being binocular in nature. The visual appearance of the field of view is that of a view of field stops superimposed on the object field. Each eye has its own field stop and the field stop centers are separated by the divergence angle given to the telescopes. The total available horizontal field of view is equal to twice the field of view of one of the telescopes, less the angle of overlap.

In the region where the field stops overlap, objects are visible to both of the user's eyes. Hence in this region stereopsis is available. Outside of the overlap area objects are visible to one eye only. Since the entrance pupils of the telescopes are widely separated, stereopsis in the overlap region is accentuated, and the ability to differentiate relative object distances is enhanced for the user.

We are aware that it has been proposed in British Patent No. 572,506 to provide a binocular telescopic instrument with a partial overlap of the fields of the two telescopes thereof. The instrument there disclosed is however of narrow angular field, consistently with the provision of substantial angular magnification, and it gives to the user a total true field of the order of 50° or 60° at most. The present invention provides a true angular field to the user of the order of 150° which may indeed extend to 180°. So far as is known to applicants, the present invention provides for the first time a binocular instrument of such wide true field coverage in which the exit pupils are so positioned as actually to permit binocular use of the instrument.

The invention will now be described in greater detail in reference to the accompanying drawings in which.

Figure 1:
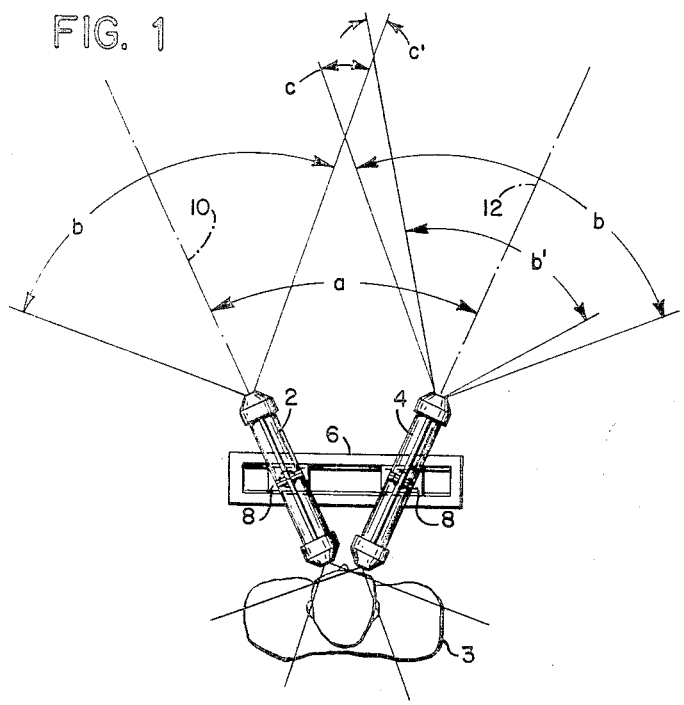
FIG. 1 is a plan view of an instrument according to the invention, illustrating the fields of view provided to a user thereby.
Figure 6:
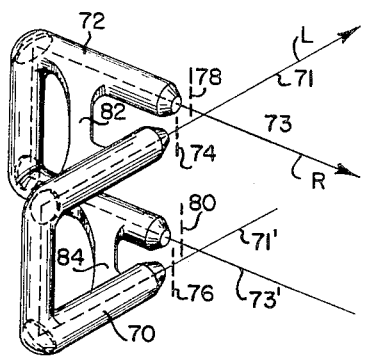
FIG. 6 is a diagrammatic perspective view of another embodiment of the invention in which each telescope deviates the line of sight of the observer's eyes through 180°.

In FIG. 1, two telescopes are shown at 2 and 4, supported in fixed relative position by means of a coupling member 6. The axis of telescope 2 is indicated at 10 and the axis of telescope 4 is indicated at 12. These axes are inclined to each other at an angle $a$ which may in practice be of the order of 50°. Each of the telescopes 2 and 4 is an erecting telescope of unit power, and the two are identical. Each possess a field $b$ which may in practice be of the order of 90°. The angle $a$ of inclination between the two telescope axes is made substantially less than the angle $b$ so as to provide an angular overlap $c$ within which region binocular vision is provided. Evidently, $c=b-a$.

Advantageously, means are provided for adjusting the inclination $a$ of the axes 10 and 12, and also for adjusting the interpupillary spacing of the exit pupils. Thus one of the telescopes, as the telescope 4, may be mounted on a plate 8 movable on guideways formed in the plate 6. The telescope 4 will then be pivotally mounted on the plate 8, so as to rotate about an axis perpendicular to the plane defined by axes 10 and 12.

Figure 2:
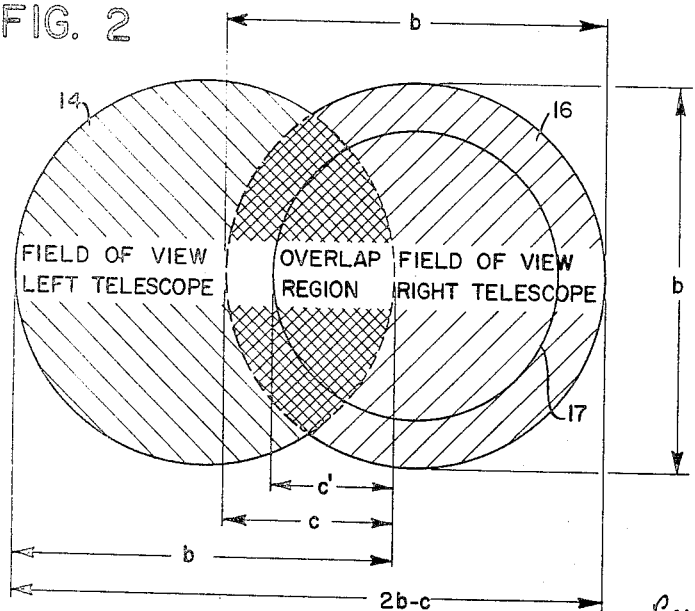
FIG. 2 is a diagram illustrating in another fashion the fields of view provided by the instrument of FIG. 1.

These relationships are further illustrated in FIG. 2 where the circles 14 and 16 represent the fields of view of the left and right telescopes 2 and 4 respectively. The region of overlap is indicated also, together with the angular extent $c$ thereof. It will be observed that in angular extent the vertical field is $b$, the total horizontal field is $2b-c$ and the overlap region is $c$ at the median horizontal plane.

In accordance with the invention, the exit pupil positions of the telescopes 2 and 4 are adjusted to permit the observer 3 simultaneously to place his left and right eyes respectively at the exit pupils of those two telescopes. This is accomplished by a suitable proportioning of the powers of the objective and eyepiece, and of the erecting and other lenticular elements in each telescope additional to the objective and the eyepiece, and to any field lenses which may be associated with that objective and eyepiece. This proportioning is stated in terms of the powers $\Phi_I$ and $\Phi_{II}$ of the objective and eyepiece (each including any such associated field lens), in terms of the angular magnification M of the telescope, and in instruments in which the objective and eyepiece focal planes are not coincident but are separated, in terms of two powers $\Phi_{III}$ and $\Phi_{IV}$ associated with the lenticular elements which act between these planes. In a telescope having spaced objective and eyepiece focal planes—the only type in which $\Phi_{III}$ and $\Phi_{IV}$ exist—the telescope will have an aperture stop between those focal planes, and this aperture stop will usually though not necessarily have collimated light passing through it. Usually this aperture stop will be a diaphragm or other device constricting the diameter of the ray bundle passing through it, or it may be an image of a ray constricting device located in either the eyepiece or objective part of the telescope, i.e., located outside those focal planes. In either case, $\Phi_{III}$ is the power of the lenses between the first focal plane of the telescope for distant objects and this aperture stop, and $\Phi_{IV}$ is the power of the lenses between this aperture stop and the last focal plane of the telescope for distant objects. An erecting telescope having a set of erector lenses to relay the image from the objective focal plane to the eyepiece focal plane and to rotate it through 180° in so relaying it is an example of a telescope having spaced objective and eyepiece focal planes in which $\Phi_{III}$ and $\Phi_{IV}$ exist.

According to the invention, the quantities $\Phi_I$, $\Phi_{II}$, $\Phi_{III}$, $\Phi_{IV}$ and M for each of the telescopes 2 and 4 satisfy the relation $$50^{-1}\Phi_I < (\Phi_{III} + \Phi_{IV} + M\Phi_{II}) < 50\Phi_I \qquad (1)$$

In relation (1), the power symbol $\Phi$ means, for any lens or combination of lenses considered as a thick lens, the reciprocal of the equivalent focal length E.F.L. thereof, with E.F.L.$=h/\sin \mu$ wherein $h$ is the height of a paraxial incident ray parallel to the axis and $\mu$ is the inclination to the axis of the refracted emergent ray.

It is to be understood, as will moreover be explained with reference to FIG. 5, that in embodiments of the invention wherein the objective and eyepiece focal planes are coincident, erection of the image, if provided, being effected for example by mirrors or reflecting prisms, the powers $\Phi_{III}$ and $\Phi_{IV}$ are both of zero value.

Figure 4:
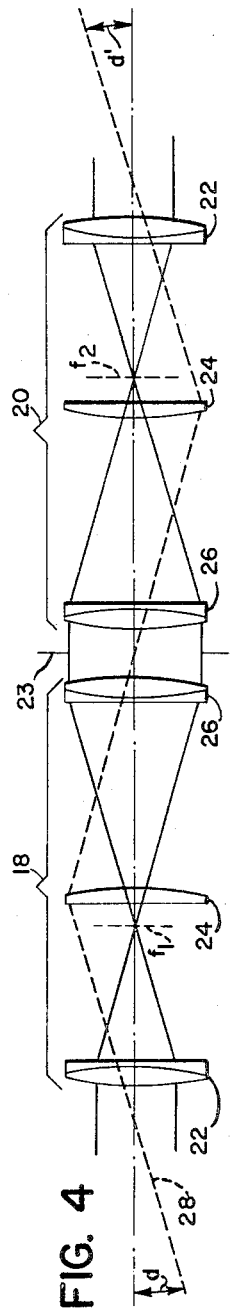
FIG. 4 is an optical diagram showing, for a simplified form of unit power erecting telescope, the constant deviation properties thereof.

The application of this relation to the telescopes 2 and 4 will be clarified by reference to FIG. 4 which shows the optical components of a simple system suitable for use in each of the telescopes 2 and 4 of FIG. 1. The instrument schematically shown in FIG. 4 comprises two identical telescopes 18 and 20 arranged coaxially back-to-back. Accordingly, although their individual powers may depart from unity, the total power of the combination of telescopes 18 and 20 is unity. Each includes a two-element eyepiece 22, a two-element objective 26, and a field lens 24. The aperture stop of the system is shown at 23 between the two objectives 26, which in the complete instrument of FIG. 4 function as a set of erectors. Either end of the complete instrument of FIG. 4 can be regarded as the objective end. If the end including the telescopic combination 18 is considered to be present to the object field to be viewed, the components 22 and 24 in combination 18 constitute the objective of the complete system of FIG. 4 and the similarly numbered components in combination 20 constitute the eyepiece thereof. The objective focal plane is indicated at $f_1$ and the eyepiece focal plane is indicated at $f_2$. The power $\Phi_I$ will be the combined power of components 22 and 24 in combination 18 and the power $\Phi_{II}$ will be the combined power of the components 22 and 24 in combination 20. The power $\Phi_{III}$ will be the power of the left-hand component 26 and the power $\Phi_{IV}$ will be the power of the right-hand element 26. It will be noted that the light is parallel between the two components 26. In accordance with the invention, the components of the single telescopic system constituted by the complete instrument of FIG. 4 satisfies the relation (1).

In the case supposed, $\Phi_I$ and $\Phi_{II}$ are equal and M equals unity. Accordingly the relation (1) reduces to $$50^{-1}\Phi_I < (\Phi_{III} + \Phi_{IV} + \Phi_I) < 50\Phi_I$$

FIG. 4 further illustrates the constant deviation properties of a unit power erecting telescope. The system of FIG. 4 is of unit power and is erecting by virtue of its make-up from two identical telescopic systems 18 and 20 arranged back-to-back.

A ray 28 arriving from a distant object is seen to enter the instrument at the left at an inclination $d$ to the axis of the instrument and to emerge at the right-hand end of the instrument with this same inclination, denoted $d'$. The instrument is overall therefore of unit power and it is erecting since the emergent ray possesses not only the same inclination to the axis as does the entering ray but is in fact parallel thereto. This last fact moreover is a statement of the constant deviation properties of the instrument. These properties permit motion of the telescope, with change in the orientation of its axis, with respect to the object field without any change in the image presented to the observer. The ratio $d'/d$ is the angular magnification produced by the telescope which comprises the totality of components shown in FIG. 4.

Figure 3:
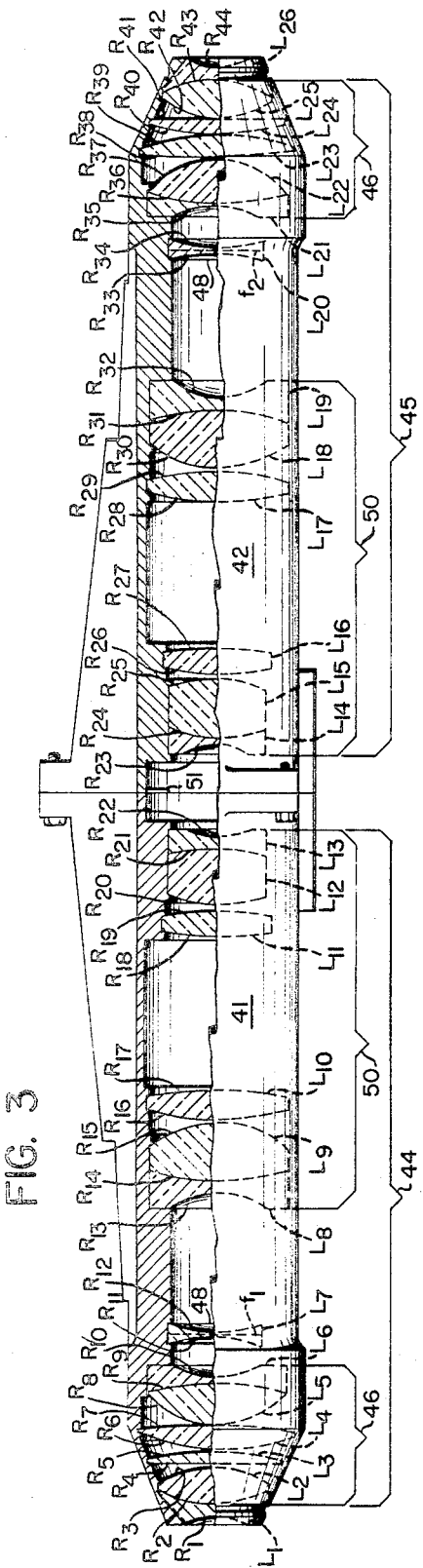
FIG. 3 is a vertical axial section through one of the telescopes of FIG. 1.

A suitable form of telescope for each of the telescopes 2 and 4 of FIG. 1 is shown in FIG. 3. In FIG. 3 two tubes 41 and 42 are disposed coaxially and contain telescopic lens combinations indicated at the brackets 44 and 45 respectively. The telescopes 44 and 45 are identical and are arranged coaxially back-to-back. An aperture stop is provided at 51 adjacent the junction of tubes 41 and 42. Each may be considered to include an eyepiece 46, an objective 50 and a focal plane aspheric corrector lens 48. The combined telescopic system of FIG. 3 including the systems 44 and 45 may be regarded as having, as its objective, the left-hand lens combination 46 and as having, as its eyepiece, the right-hand lens combination 46. The objective focal plane is indicated at $f_1$ and the eyepiece focal plane at $f_2$. The power $\Phi_I$ is therefore the power of the left-hand combination 46 combined with the adjacent corrector lens 48, while the power $\Phi_{II}$ is the power of the right-hand combination 46 combined with the power of the corrector 48 adjacent thereto. The power $\Phi_{III}$ is the power of the left-hand lens combination 50 between $f_1$ and stop 51 and the power $\Phi_{IV}$ is the power of the right-hand lens combination 50 between stop 51 and $f_2$. It will be noted that the light passing through the system of FIG. 3 is parallel in the space between $L_{13}$ and $L_{14}$, the last and first elements respectively of the left and right-hand combinations 50. These four powers satisfy the relation (1), M being of unity value. In the specific design for which data are presently to be given on a system as illustrated in FIG. 3, the powers $\Phi_I$, $\Phi_{II}$, $\Phi_{III}$ and $\Phi_{IV}$ have respectively the values 20.4413 diopters, 20.4413 diopters, 6.3729 diopters and 6.3729 diopters.

The telescopes 44 and 45 and the single telescope of FIG. 3 which they together form should be designed to possess low distortion and a relatively uniform correction over the entire field of view. In the first place, in the overlap region $c$ of FIG. 1, an object in the outside world while appearing at the same angle to the user as seen through both telescopes 2 and 4 is actually being observed (unless located angularly half way between the axes 10 and 12), at a different field angle relative to the axis of each telescope. This requires that the telescopes 2 and 4 possess relatively good distortion correction. For example, if the angle $c$ of overlap is 40° and if the field $b$ of each telescope is 90° and if 10% distortion were allowed at the edge of the 90° field of each telescope, then a point at the edge of the field of one telescope and 5° off the axis of the other telescope would have a difference in apparent direction to the observer's eyes of approximately 4½°. This would be visually intolerable. In order to correct distortion as well as other lateral aberrations, namely coma, lateral chromatic aberration and chromatic variation in magnification, the individual telescopes 2 and 4 are preferably designed as purely symmetrical instruments. This requires that only longitudinal aberrations be corrected in the separate halves 44 and 45 (shown in FIG. 3) of each of the telescopes 2 and 4 (shown in FIG. 1).

A second important consideration in the design of a satisfactory instrument according to the invention is the fact that the central and therefore the most important portion of its field of view lies at the center of the overlap region and therefore at the outer portions of the individual fields of view of the two telescopes 2 and 4. This requires a smooth correction over the whole field of view, without tolerance of the degradation of performance at the edge of the field which is normally accepted in even moderately wide field instruments.

It is also desirable to provide a large exit pupil diameter, a large eye relief, and minimum vignetting across the entire field of view. In one instrument which has been constructed with a 90° circular field for each telescope, the exit pupils were 15 millimeters in diameter and were located 25 millimeters from the last lens surface. In this instrument vignetting was practically non-existent.

FIG. 3 represents a design for the unit power telescopes responsive to these requirements, and having these desirable properties. Two telescopes of the type illustrated in FIG. 3, when mounted together in the manner illustrated in FIG. 1, constitute an embodiment of the invention. The telescope of FIG. 3 comprises two identical combinations of lenses 44 and 45. Each of these lens combinations by itself constitutes a three-power, non-erecting telescope. The lens combinations 44 and 45 are mounted coaxially back-to-back, by means of the tubes 41 and 42, to form together a single unit power erecting telescope. Each of the telescopic lens combinations 44 and 45 contains an eyepiece 46, a focal plane aspheric corrector lens 48, and an objective 50. The eyepiece and the objective are high quality units each including six glass elements. In the objectives 50, the three elements adjacent the lens 48 may be regarded as constituting the field lens part of the objective.

There will now be given data on a design of the type illustrated in FIG. 3. For this purpose, and counting from left to right in FIG. 3, the twenty-six lens elements will be identified as $L_1$ to $L_{26}$ and their thicknesses as $t_1$ to $t_{26}$. The radii of curvature $R_1$ to $R_{44}$ of the surfaces of the lens elements are indicated in the figure. The spacings of each of the elements $L_1$ to $L_{25}$ inclusive from the element next following are identified as $s_1$ to $s_{24}$. The space between $L_{13}$ and $L_{14}$ is indicated as comprising a space $s_{13a}$ between $L_{13}$ and the diaphragm 51, and a space $s_{13b}$ between diaphragm 51 and $L_{14}$. With this nomenclature, the makeup of the design under consideration is given in the following table:

| Element | Radii | Thickness t or Spacing s | Index | Abbe No. |
|---|---|---|---|---|
| $L_1$ | $R_1 = -51.25$ mm. | $t_1 = 9.2$ mm. | 1.647 | 33.9 |
|  | $R_2 = +118.8$ mm. | | | |
| $L_2$ | $R_3 = -71.46$ mm. | $t_2 = 32.7$ mm. | 1.697 | 55.6 |
|  | $R_4 = \infty$ | $s_2 = 0.2$ mm. | | |
| $L_3$ | $R_5 = -177.8$ mm. | $t_3 = 11.5$ mm. | 1.697 | 55.6 |
|  | $R_6 = +177.8$ mm. | $s_3 = 0.2$ mm. | | |
| $L_4$ | $R_7 = -305.7$ mm. | $t_4 = 23.0$ mm. | 1.697 | 55.6 |
|  | $R_8 = +86.33$ mm. | $s_4 = 0.2$ mm. | | |
| $L_5$ | $R_9 = -175.3$ mm. | $t_5 = 38.0$ mm. | 1.697 | 55.6 |
| $L_6$ | $R_{10} = +178.4$ mm. | $t_6 = 4.4$ mm. | 1.689 | 31.2 |
|  | $R_{11} = -140.5$ mm. | $s_5 = 28.6$ mm. | | |
| $L_7$ | $R_{12} = $ Asph. | $t_7 = 5.0$ mm. | 1.517 | 64.2 |
|  | $R_{13} = -66.25$ mm. | $s_7 = 36.5$ mm. | | |
| $L_8$ | $R_{14} = +217.4$ mm. | $t_8 = 8.8$ mm. | 1.617 | 36.6 |
| $L_9$ | $R_{15} = -103.1$ mm. | $t_9 = 48.8$ mm. | 1.613 | 58.6 |
|  | $R_{16} = +296.1$ mm. | $s_9 = 3.6$ mm. | | |
| $L_{10}$ | $R_{17} = -415.0$ mm. | $t_{10} = 21.4$ mm. | 1.613 | 58.6 |
|  | $R_{18} = +395.3$ mm. | $s_{10} = 211.6$ mm. | | |
| $L_{11}$ | $R_{19} = -328.6$ mm. | $t_{11} = 21.4$ mm. | 1.613 | 58.6 |
|  | $R_{20} = +101.9$ mm. | $s_{11} = 3.6$ mm. | | |
| $L_{12}$ | $R_{21} = -217.4$ mm. | $t_{12} = 48.8$ mm. | 1.613 | 58.6 |
| $L_{13}$ | $R_{22} = +66.25$ mm. | $t_{13} = 8.8$ mm. | 1.617 | 36.6 |
|  |  | $s_{13a} = 38.95$ mm. | | |
|  |  | $s_{13b} = 38.95$ mm. | | |
| $L_{14}$ | $R_{23} = -66.25$ mm. | $t_{14} = 8.8$ mm. | 1.617 | 36.6 |
|  | $R_{24} = +217.4$ mm. | | | |
| $L_{15}$ | $R_{25} = -101.9$ mm. | $t_{15} = 48.8$ mm. | 1.613 | 58.6 |
|  | $R_{26} = +328.6$ mm. | $s_{15} = 3.6$ mm. | | |
| $L_{16}$ | $R_{27} = -395.3$ mm. | $t_{16} = 21.4$ mm. | 1.613 | 58.6 |
|  | $R_{28} = +415.0$ mm. | $s_{16} = 211.6$ mm. | | |
| $L_{17}$ | $R_{29} = -296.1$ mm. | $t_{17} = 21.4$ mm. | 1.613 | 58.6 |
|  | $R_{30} = +103.1$ mm. | $s_{17} = 3.6$ mm. | | |
| $L_{18}$ | $R_{31} = -217.4$ mm. | $t_{18} = 48.8$ mm. | 1.613 | 58.6 |
| $L_{19}$ | $R_{32} = +66.25$ mm. | $t_{19} = 8.8$ mm. | 1.617 | 36.6 |
|  |  | $s_{19} = 36.5$ mm. | | |
| $L_{20}$ | $R_{33} = $ Asph. | $t_{20} = 5.0$ mm. | 1.517 | 64.2 |
|  | $R_{34} = +140.5$ mm. | $s_{20} = 28.6$ mm. | | |
| $L_{21}$ | $R_{35} = -178.4$ mm. | $t_{21} = 4.4$ mm. | 1.689 | 31.2 |
| $L_{22}$ | $R_{36} = +175.3$ mm. | $t_{22} = 38.0$ mm. | 1.697 | 55.6 |
|  | $R_{37} = -86.33$ mm. | $s_{22} = 0.2$ mm. | | |
| $L_{23}$ | $R_{38} = +305.7$ mm. | $t_{23} = 23.0$ mm. | 1.697 | 55.6 |
|  | $R_{39} = -177.8$ mm. | $s_{23} = 0.2$ mm. | | |
| $L_{24}$ | $R_{40} = +177.8$ mm. | $t_{24} = 11.5$ mm. | 1.697 | 55.6 |
|  | $R_{41} = \infty$ | $s_{24} = 0.2$ mm. | | |
| $L_{25}$ | $R_{42} = +71.46$ mm. | $t_{25} = 32.7$ mm. | 1.697 | 55.6 |
| $L_{26}$ | $R_{43} = -118.8$ mm. | $t_{26} = 9.2$ mm. | 1.647 | 33.9 |
|  | $R_{44} = +51.25$ | | | |

In this table the surfaces $R_{12}$ and $R_{33}$ are indicated as being aspheric, and hence no single value of radius of curvature is assigned to either of them.

The invention is of course not limited to the form shown in FIG. 1 of the drawings. The optical path in each telescope may for example be bent into the shape of a Z, for example, as in each of the telescopes of the ordinary collimated binoculars. If the telescopes are bent into Z shape, their length is reduced at the expense of some increase in height. In such an embodiment, each telescope may be rotated about its axis at the eyepiece end thereof to change the separation of the entrance pupils of the telescopes and thus to change the amount of stereopsis available.

Figure 5:
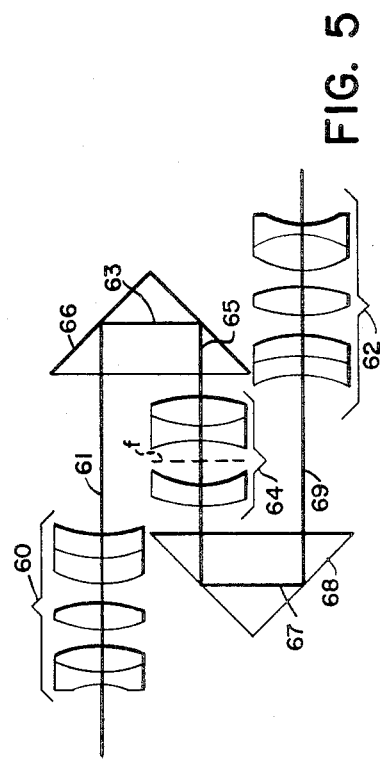
FIG. 5 is a diagram of another form of telescope useable in the instrument of the invention, employing prisms for erection of the image.

FIG. 5 is a diagram of another form of telescope useable in the instrument of the invention, employing prisms for erection of the image. Two telescopes as illustrated in FIG. 5 may be combined, with their axes inclined to each other, to make up an instrument according to the invention. The telescope of FIG. 5 is of interest in that it has only a single focal plane, indicated at $f$, so that the quantities $\Phi_{III}$ and $\Phi_{IV}$ thereof are both equal to zero in relation (1) as applied to this telescope.

In FIG. 5, there is shown at 60 a five-element objective, at 62 a five-element eyepiece, at 64 a field lens and at 66 and 68 two Porro prisms which serve respectively to invert and revert the image produced by the objective. The field lens is disposed on the optical axis between the two prisms. For simplicity of the drawing the prisms 66 and 68 have been shown both in the same plane, but in a telescope constructed according to FIG. 5 the prisms 68 would be rotated through 90° so that the complete telescope would possess an axis occupying three-dimensional space. Thus if the axis is regarded as possessing five por-

constructed of power distinctly different from unity, the instrument must however be constructed for operation with a fixed inclination between the axes of the objectives of the two telescopes. This is necessary because with such non-unit power for the telescopes, lack of parallelism between the axes of their objectives requires that the axes of their eyepieces be inclined to each other at an angle related to the inclination of the objective axes to each other proportional to the power of the telescope.

We claim:

1. A visual telescopic instrument for the observation of a wide field of view, said instrument comprising two telescopes of substantially the same angular magnification M each including an objective and an eyepiece, and means to support said telescopes with the axes of their objectives inclined to each other at an angle which is greater than zero and less than the arithmetic average of the angular fields of the two telescopes and with the exit pupils of the two telescopes separated substantially by the human interpupillary distance, said telescopes having the axes of their eyepieces inclined to each other by an angle which is substantially proportional to the angular separation of the axes of said objectives multiplied by M, each of said telescopes conforming to the relation:

$$50^{-1}\Phi_I < (\Phi_{III} + \Phi_{IV} + M\Phi_{II}) < 50\Phi_I$$

wherein $\Phi_I$ is the power of the objective, $\Phi_{II}$ is the power of the eyepiece, and, in telescopes including spaced focal planes, $\Phi_{III}$ is the power of the lenticular elements between the first of said planes and an aperture stop located between the first and last of said planes, and $\Phi_{IV}$ is the power of the lenticular elements between said aperture stop and the last of said planes.

2. An instrument according to claim 1 in which M is substantially equal to unity.

3. An instrument according to claim 2 in which said telescopes are erecting.

4. An instrument according to claim 3 wherein each of said telescopes includes two telescopic lens combinations supported back-to-back in optically coaxial relation, the powers of said two telescopic combinations being reciprocally related.

5. An instrument according to claim 3 wherein the two telescopes have a smooth correction over the entire field of view thereof.

6. An instrument according to claim 1 wherein each of said telescopes has a true angular field of the order of 70° or more.

References Cited

UNITED STATES PATENTS

| | | | |
|---|---|---|---|
| 2,387,838 | 10/1945 | French | 88—33 |
| 2,588,414 | 3/1952 | Rosin | 88—32 |
| 2,719,457 | 10/1955 | Tripp | 88—72 |
| 2,661,647 | 12/1953 | French | 88—34 |

FOREIGN PATENTS 425,383   3/1935   Great Britain.

JOHN K. CORBIN, *Primary Examiner.*